(12) United States Patent
Dewa et al.

(10) Patent No.: US 7,535,543 B2
(45) Date of Patent: May 19, 2009

(54) LIQUID CRYSTAL DISPLAY APPARATUS AND COOLING DEVICE

(75) Inventors: Shigekuni Dewa, Tokyo (JP); Masashi Yamada, Kanagawa (JP); Takuji Ohkubo, Chiba (JP); Takashi Nasu, Tokyo (JP)

(73) Assignee: Sony Corporation, Tokyo (JP)

( * ) Notice: Subject to any disclaimer, the term of this patent is extended or adjusted under 35 U.S.C. 154(b) by 476 days.

(21) Appl. No.: 11/289,225

(22) Filed: Nov. 29, 2005

(65) Prior Publication Data

US 2006/0125998 A1    Jun. 15, 2006

(30) Foreign Application Priority Data

Dec. 15, 2004    (JP)    ............................ P2004-363056

(51) Int. Cl.
*G02F 1/1333*    (2006.01)
(52) U.S. Cl. ........................... 349/161; 349/60; 353/52; 353/54; 353/161
(58) Field of Classification Search .................. 349/161; 353/52, 54
See application file for complete search history.

(56) References Cited

U.S. PATENT DOCUMENTS 5,978,054 A * 11/1999 Fujimori ..................... 349/60
7,073,912 B2 * 7/2006 Yanagisawa et al. .......... 353/61
7,123,334 B2 * 10/2006 Kaise et al. .................. 349/161
7,139,062 B2 * 11/2006 Saitoh ......................... 349/161
7,226,171 B2 * 6/2007 Fujimori et al. ............... 353/52

FOREIGN PATENT DOCUMENTS

| JP | 05-264947 | 10/1993 |
| JP | 07-181463 | 7/1995 |
| JP | 2006/003898 | 1/2006 |
| JP | 2006-017799 | 1/2006 |
| JP | 2006-017833 | 1/2006 |

* cited by examiner

*Primary Examiner*—Julie Ngo
(74) *Attorney, Agent, or Firm*—Sonnenschein Nath & Rosenthal LLP

(57) ABSTRACT

A liquid crystal display device constrains the injection of air bubbles in a cooling fluid into a display panel. In the display device, the cooling fluid is supplied to a receiving space of a receiving unit placed and opposed to a surface of a liquid crystal panel to which the light is emitted from a light source to thereby cool the liquid crystal panel. Namely, by a cooling fluid pump, the cooling fluid received in the receiving unit is drained from a drain port and the cooling fluid is supplied from a feed port to the receiving unit and received in the receiving space. In the above case, a part of a flow path of the cooling fluid supplied from the feed port is blocked by a flow path block unit placed and opposed to the feed port to thereby disperse the flow thereof around the flow path block unit.

12 Claims, 7 Drawing Sheets

LIQUID CRYSTAL DISPLAY APPARATUS AND COOLING DEVICE

CROSS REFERENCES TO RELATED APPLICATIONS

The present invention contains subject matter related to Japanese Patent Application JP 2004-363056 filed in the Japanese Patent Office on Dec. 15, 2004, the entire contents of which being incorporated herein by reference.

BACKGROUND OF THE INVENTION

1. Field of the Invention

The present invention relates to a liquid crystal display apparatus and a cooling device, particularly, a liquid crystal display apparatus cooling a surface of a liquid crystal panel to which light is emitted from a light source and transmitting the light from the light source via a cooling fluid, and a cooling device for the same.

2. Description of the Related Art

There is known a liquid crystal display apparatus including a liquid crystal panel in which a liquid crystal layer is sealed between a pair of substrates. In the liquid crystal apparatus, the liquid crystal panel modulates the light emitted from a light source. And the apparatus displays an image by applying the modulating light. The above liquid crystal display apparatus has merits such as thin, light weight, and a lower power, compared with a cathode ray tube (CRT). Therefore, the liquid crystal display apparatus is applied as a direct view type display device to electric equipments such as a personal computer, a portable phone, and a digital camera, also, applied as a projection type display device such as a projector.

The liquid crystal display apparatus is demanded to display an image in a large screen in order to improve visibility.

In displaying the image in the large screen, a size of a display area of the liquid crystal panel is substantially equal to a screen size in the direct view type liquid crystal display apparatus. Therefore, the display area for the image is enlarged by adapting a large-sized liquid crystal panel or combining a plurality of small liquid crystal panels. Consequently, the direct type liquid crystal display device may be expensive in order to display the image in the large screen.

The projection type liquid crystal display apparatus emits light from the light source to the small liquid crystal panel, and enlarges and projects an image to be displayed on the liquid crystal panel through a lens to realize the resultant display of the image in the screen. Therefore, in this case, the projection type liquid crystal display apparatus can be produced in lower cost than the direct view type display device. Consequently, in displaying the image in the large screen, the projection type liquid crystal display apparatus has been used more than the direct view type display apparatus.

The projection type liquid crystal display apparatus, for example, is classified into a single-plate type and a three-plate type. The single-plate type divides the primary colors spatially or temporal by using a single liquid crystal panel, and displays an image. The three-plate type display apparatus displays the respective primary colors images on three liquid crystal panels, combines the images displayed on the three liquid crystal panels by a dichroic prism to form a single image, enlarges and projects the same, and displays the result on a screen.

When the above projection type liquid crystal display apparatus projects the image on the screen, most of the light emitted from the light source, not applied to the image projected and displayed on the screen, is absorbed into each of configuration members of the liquid crystal display apparatus such as the liquid crystal panel to generate heat thereof.

There is also known a liquid crystal panel in which a temperature range capable of realizing appropriate functions is limited. For example, when the temperature of the liquid crystal panel is higher than the rated temperature range, characteristics of a liquid crystal layer in the liquid crystal panel may change or air bubbles may be generated in the liquid crystal layer. And the displayed image quality may deteriorate. Otherwise, when the liquid crystal panel is retained for a long time at the temperature other than the rated temperature, the performance thereof may deteriorate, and a lifetime of the apparatus may be shortened. Therefore, the projection type liquid crystal display apparatus in which large intensity light is emitted to the liquid crystal panel is provided with a cooling device for cooling the liquid crystal panel.

In order to cool the liquid crystal panel, as a cooling device, Japanese Unexamined Patent Publication (Kokai) No. 2003-302619 discloses an air cooling system, and Japanese Unexamined Patent Publication (Kokai) No. 05-264947 discloses a fluid cooling system.

SUMMARY OF THE INVENTION

In the air cooling system, a cooled air is supplied to a display area of the liquid crystal panel by a cooling fan to thereby cool the liquid crystal panel. Therefore, this system suffers from disadvantages that sounds generated by driving the cooling fan become noise. In the case of the projection type liquid crystal display apparatus, the liquid crystal panel is small-sized in order to satisfy a demand for a small-sized device, as a result, a heating amount per a unit area increases. Therefore, the cooling fan must be made large to improve a cooling effect, which results the disadvantage of the obvious noise generated by the cooling fan. In this method, by sending the cooling air from the cooling fan, dust included in the cooling air may be frequently deposited on a surface of the liquid crystal panel, so the image quality may sometimes deteriorate due to the dust. Also, in this method, when fixing a polarizing plate, a sappier glass substrate having a high thermal conductivity may be used to thereby radiate (dissipate) heat efficiently, so it suffers from a disadvantage that a production cost increases.

On the other hand, in the fluid cooling system, a pump is used to supply a cooling fluid to the display area of the liquid crystal panel to thereby cool the liquid crystal panel. In this system, the light passed through the liquid crystal panel and the cooling fluid is displayed as an image. In this system, since the cooling fluid is used, the liquid crystal panel can be cooled at higher cooling efficiency than that of the cooling air and the noise caused by the drive sound can be suppressed. Along with this, the sappier glass substrate is unnecessary when fixing the polarizing plate, so a low-priced glass substrate can be used and the production cost can be reduced.

Specifically, although the high cooling efficiency is demanded for the projection type liquid crystal display apparatus as described above, so the cooling efficiency may sometimes be low and insufficiency in the fluid cooling method.

Further, in the fluid cooling system, an air bubble appears in the cooling fluid due to a circulation thereof, which may cause the image quality deteriorate. For example, the air bubble of a diameter in 100 to 300 μm per a pixel in 10 μm width, may appear in the cooling fluid, as a result, since light transmittance of the air bubble is different from that of the cooling fluid, the light intensity passed through the air bubble is different from that of the cooling fluid, which may result the disadvantage of the obvious deteriorate of the image quality.

Therefore, in the case where the liquid crystal panel of the liquid crystal display apparatus is cooled and adjusted to the rated temperature range, since the cooling efficiency is insufficient, it may be difficult to improve a reliability of the apparatus. Also, it may be difficult to suppress the noise and reduce the production cost and improve the image quality.

It is desirable to provide a liquid crystal apparatus capable of improving the cooling efficiency for improving the reliability of the apparatus, and suppressing the noise and reducing the production cost, and improving the image quality, and a cooling device for the same.

According to an embodiment of the present invention, there is provided with a liquid crystal display apparatus including a light source emitting light, a liquid crystal panel modulating the light emitted by the light source, and a cooling unit cooling a surface of the liquid crystal panel by using a cooling fluid, the light emitted from the light source transmitting into the cooling fluid, the light emitted from the light source is used for displaying an image by the liquid crystal panel and the cooling fluid, the cooling unit having: a receiving unit formed with a feed port to which the cooling fluid is supplied and a drain port from which the cooling fluid is drained, and receiving the cooling fluid supplied from the feed port in a receiving space; a cooling fluid pump draining the cooling fluid received in the receiving unit from the drain port, and supplying the cooling fluid from the feed port to the receiving unit to cause the receiving space to receive the cooling fluid; and a flow path block unit blocking a part of the flow path of the cooling fluid supplied from the feed port to an area corresponding to the liquid crystal panel in the received unit, wherein the receiving space is placed and opposed to a surface of the liquid crystal panel to which the light is emitted from the light source, and wherein the flow path block unit is placed and opposed to the feed port.

The cooling fluid is supplied from the feed port to the receiving space of the receiving unit placed and opposed to the surface of the liquid crystal panel to which light is emitted from the light source, so the liquid crystal panel is cooled by the cooling fluid received in the receiving space. By the cooling fluid pump, the cooling fluid received in the received unit is drained from the drain port of the receiving unit, and the cooling fluid is supplied from the feed port to the receiving unit and received in the receiving space. In the above case, a part of the flow path of the cooling fluid supplied by the cooling fluid pump from the feed port to the region in the receiving unit corresponding to a display area of the liquid crystal panel, is blocked by the flow path block unit placed and opposed to the feed port to thereby change the flow path of the cooling fluid supplied from the feed port around the flow path block unit. Therefore, air bubbles in the cooling fluid are dispersed by the flow path block unit and supplied to the receiving space, flow in the receiving space along the flow path changed by the flow path block unit, and are drained from the drain port.

According to another embodiment of the present invention, there is provided with a cooling device cooling a surface of a liquid crystal panel by using a cooling fluid, a light emitted from a light source being emitted to the liquid crystal panel and transmitted into the cooling fluid, the device having: a receiving unit formed with a feed port to which the cooling fluid is supplied and a drain port from which the cooling fluid is drained, and receiving the cooling fluid supplied from the feed port in a receiving space; a cooling fluid pump draining the cooling fluid received in the receiving unit from the drain port, and supplying the cooling fluid from the feed port to the receiving unit to cause the receiving space to receive the cooling fluid; and a flow path block unit blocking a part of the flow path of the cooling fluid supplied from the feed port to an area corresponding to the liquid crystal panel in the received unit, wherein the receiving space is placed and opposed to a surface of the liquid crystal panel to which the light is emitted from the light source, and wherein the flow path block unit is placed and opposed to the feed port.

The cooling fluid is supplied from the feed port to the receiving space of the receiving unit placed and opposed to the surface of the liquid crystal panel to which light is emitted from the light source, so the liquid crystal panel is cooled by the cooling fluid received in the receiving space. By the cooling fluid pump, the cooling fluid received by the received unit is drained from the drain port of the receiving unit, and the cooling fluid is supplied from the feed port to the receiving unit and received in the receiving space. In the above case, a part of the flow path of the cooling fluid supplied by the cooling fluid pump from the feed port to the region in the receiving unit corresponding to the display area of the liquid crystal panel, is blocked by the flow path block unit placed and opposed to the feed port to thereby change the flow path of the cooling fluid supplied from the feed port around the flow path block unit. Therefore, air bubbles in the cooling fluid are dispersed by the flow path block unit and supplied to the receiving space, flow in the receiving space along the flow path changed by the flow path block unit, and are drained from the drain port.

According to the other embodiment of the present invention, there is provided with a liquid crystal display apparatus including a light source emitting light, a liquid crystal panel modulating the light emitted from the light source, and a cooling unit cooling a surface of the liquid crystal panel by using a cooling fluid, the light emitted from the light source transmitting into the cooling fluid, the light emitted from the light source is used for displaying an image by the liquid crystal panel and the cooling fluid, the cooling unit having: a first receiving unit formed with a first feed port to which the cooling fluid is supplied and a first drain port from which the cooling fluid is drained, and receiving the cooling fluid supplied from the first feed port in the first receiving space; a second receiving unit formed with a second feed port to which the cooling fluid is supplied and a second drain port from which the cooling fluid is drained, and receiving the cooling fluid supplied from the second feed port in the second receiving space; a coupling unit coupling the first drain port with the second feed port such that the cooling fluid passes through between the first receiving space and the second receiving space; and a cooling fluid pump supplying the cooling fluid from the first feed port to the first receiving unit, supplying the cooling fluid received in the first receiving unit through the coupling unit to the second receiving unit, and draining the cooling fluid received in the second receiving unit from the second drain port, wherein the first flow path block unit is placed and opposed to the first feed port, and wherein the second flow path block unit is placed and opposed to the second feed port.

The cooling fluid pump supplies the cooling fluid from the first feed port to the first receiving space in the first receiving unit also supplies the cooling fluid received in the first receiving space through the coupling unit to the second receiving space in the second receiving unit, and drains the cooling fluid received in the second space from the second drain port. The liquid crystal panel is cooled from its surface by the cooling fluid received in the first receiving space of the first receiving unit, and cooled from the other surface by the cooling fluid received in the second receiving space of the second receiving unit.

According to the embodiments of the present invention, the liquid crystal apparatus capable of improving the cooling efficiency to improve the reliability of the apparatus, and suppressing the noise and reducing the production cost, and improving the image quality, and a cooling device for the liquid crystal display apparatus can be provided.

BRIEF DESCRIPTION OF THE DRAWINGS

These and other features of the present invention will be apparent in more detail with reference to the accompanying drawings, in which:

FIGS. 3A and 3B are views showing the first liquid crystal display unit according to the first embodiment of the present invention, wherein FIG. 3A is a cross-sectional view of the first liquid crystal display unit and FIG. 3B is a plan view seem from a first cooling fluid receiving unit side in the first liquid crystal display unit;

FIGS. 6A and 6B are views showing a first liquid crystal display unit according to a second embodiment of the present invention, wherein FIG. 6A is a cross-sectional view of the first liquid crystal display unit and FIG. 6B is a plan view seem from a first cooling fluid receiving unit side in the first liquid crystal display unit.

DESCRIPTION OF THE PREFERRED EMBODIMENTS

Preferred embodiments of the present invention will be described with reference to the drawings.

First Embodiment

Figure 1:
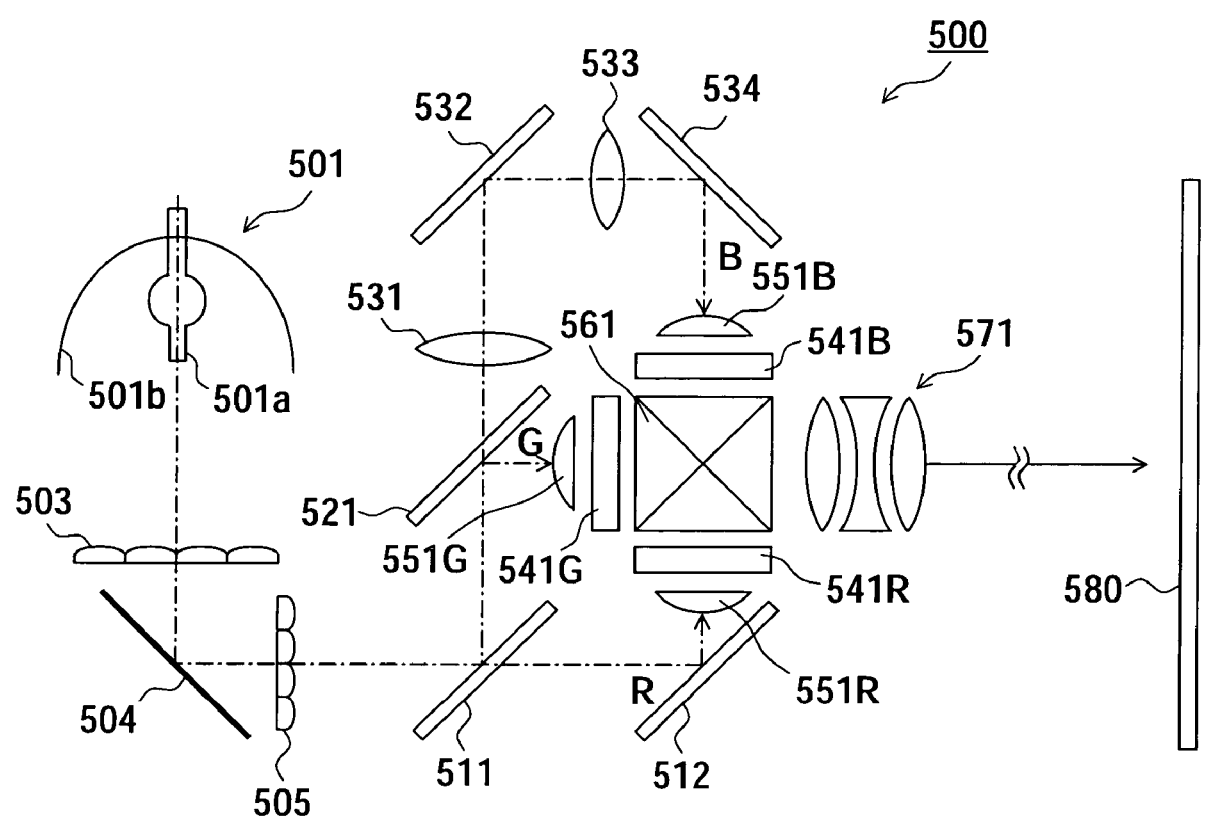
FIG. 1 is a configuration view of a liquid crystal display apparatus according to a first embodiment of the present invention.

FIG. 1 is a configuration view of a liquid crystal display apparatus according to a first embodiment of the present invention.

As shown in FIG. 1, a liquid crystal display device 500 according to the present embodiment is a three-plate projection type display device, and has a light source 501, a first lens array 503, a first reflection mirror 504, a second lens array 505, a first dichroic mirror 511, a second reflection mirror 512, a second dichroic mirror 521, a first relay lens 531, a third reflection mirror 532, a second relay lens 533, a fourth reflection mirror 534, a first liquid crystal display unit 541R, a second liquid crystal display unit 541G, a third liquid crystal display unit 541B, a first condenser lens 551R, a second condenser lens 551G, a third condenser lens 551B, a dichroic prism 561, and a projection lens unit 571.

The above respective units of the liquid crystal display device 500 according to the present embodiment will be described successively.

The light source 501 has a lamp 501a and a reflector 501b and emits light. The lamp 501a, for example, is constituted by a metal halide lamp, and emits white light radially. The reflector 501b has a reflection surface and reflects the light emitted from the lamp 501a at the reflection surface.

The first lens array 503 has a structure in which a plurality of lenses is arranged in matrix, and divides the light from the light source 501 into a plurality of light.

The first reflection mirror 504 reflects the light passed though the first lens array 503 to deflect the light to the second lens array 505.

The second lens array 505 has the same structure as the first lens array 503, in which a plurality of lenses is arranged in matrix, and supplies the light emitted from the first reflection mirror 504 to the first dichroic mirror 511.

The first dichroic mirror 511 divides the light emitted from the second lens array 505 to reflect the light including a blue color component (blue component light) B and a green color component (green component light) G and to transmit the light including a red component (red component light) R. The red color component light R is supplied to the second reflection mirror 512, and the blue component light B and the green component light G are supplied to the second dichroic mirror 521.

The second reflection mirror 512 reflects the red component light R passed through the first dichroic mirror 511 to deflect the light, and supplies the light through the first condenser lens 551R to the first liquid crystal display unit 541R.

The second dichroic mirror 521 divides the light mixed with the blue component light B and the green component light G and reflected by the first dichroic mirror 511 to transmit (pass) the blue component light B and to reflect the green component light G. The reflected green component light G is supplied through the second condenser lens 551G to the second liquid crystal display unit 541G. The blue component light G is supplied through the first relay lens 531 to the third reflection mirror 532.

The first relay lens 531 receives the light emitted from the second dichroic mirror 521 and supplies the same to the third reflection mirror 532. The first relay lens 531 is provided to improve the efficiency of the utilization of the blue component light B in which a light path length is longer than that of other color lights.

The third reflection mirror 532 reflects the blue component light B to deflect the light and supplies the light through the second relay lens 533 to the fourth reflection mirror 534.

The second relay lens 533 receives the light emitted from the third reflection mirror 532 and supplies the same to the fourth reflection mirror 534. The second relay lens 533, in the same way as the first relay lens 531, is provided to improve the efficiency of the utilization of the blue component light B in which the light path length is longer than that of the other color lights.

The fourth reflection mirror 534 reflects the blue component light B emitted from the third reflection mirror 532 and supplies the light through the third condenser lens 551B to the third liquid crystal display unit 541B.

Each of the first, second and third liquid crystal display units 541R, 541G, and 541B is placed and opposed to each light incident surface of the dichroic prism 561. Each of the first, second and third liquid crystal display units 541R, 541G, and 541B has a liquid crystal panel.

Here, the first liquid crystal display unit 541R modulates the red component light R supplied from the first condenser lens 551R, by using the liquid crystal panel therein, and emits the modulated light to the dichroic prism 561.

The second liquid crystal display unit 541G modulates the green component light G supplied from the second condenser lens 551G, by using the liquid crystal panel therein, and emits the modulated light to the dichroic prism 561.

The third liquid crystal display unit 541B modulates the blue component light B supplied from the third condenser lens 551B, by using the liquid crystal panel therein, and emits the modulated light to the dichroic prism 561.

Note that, the respective first, second and third liquid crystal display units 541R, 541G, and 541B will be mentioned later in more detail.

The dichroic prism 561 combines the respective color component lights passed through the respective first, second and third liquid crystal display units 541R, 541G, and 541B to generate a color image, and emits the generated color image to the projection lens unit 571.

The projection lens unit 571 enlarges the color image in which the light are emitted from the light source 501 through the respective units to the dichroic prism 561 and combined by the dichroic prism 561, and projects the result onto the screen 580. Although a detail will be mentioned later, the projection lens unit 571 projects the light modulated by the liquid crystal panels 601 of the respective liquid crystal display units 541R, 541G, and 541B and passed through the cooling fluid L in the cooling unit 610 of the respective liquid crystal display units 541R, 541G, and 541B.

Hereinafter, the first liquid crystal display unit 541R, the second liquid crystal display unit 541G, and the third liquid crystal display unit 541B of the liquid crystal display device 500 will be described in detail.

Figure 2:
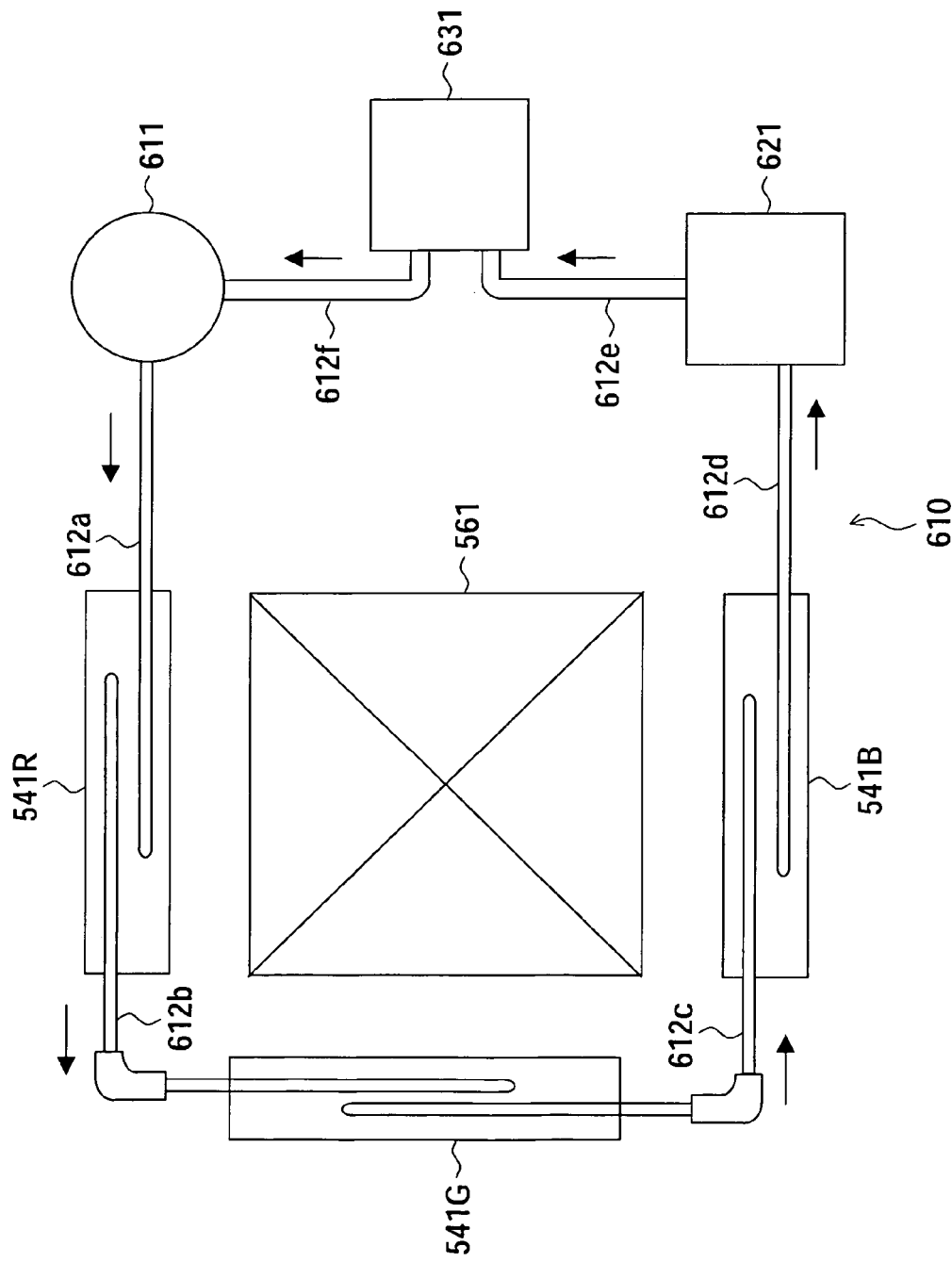
FIG. 2 is a plan view enlarged with a part of a first liquid crystal display unit, a second liquid crystal display unit, and a third liquid crystal display unit according to the first embodiment of the present invention.
Figure 3A:
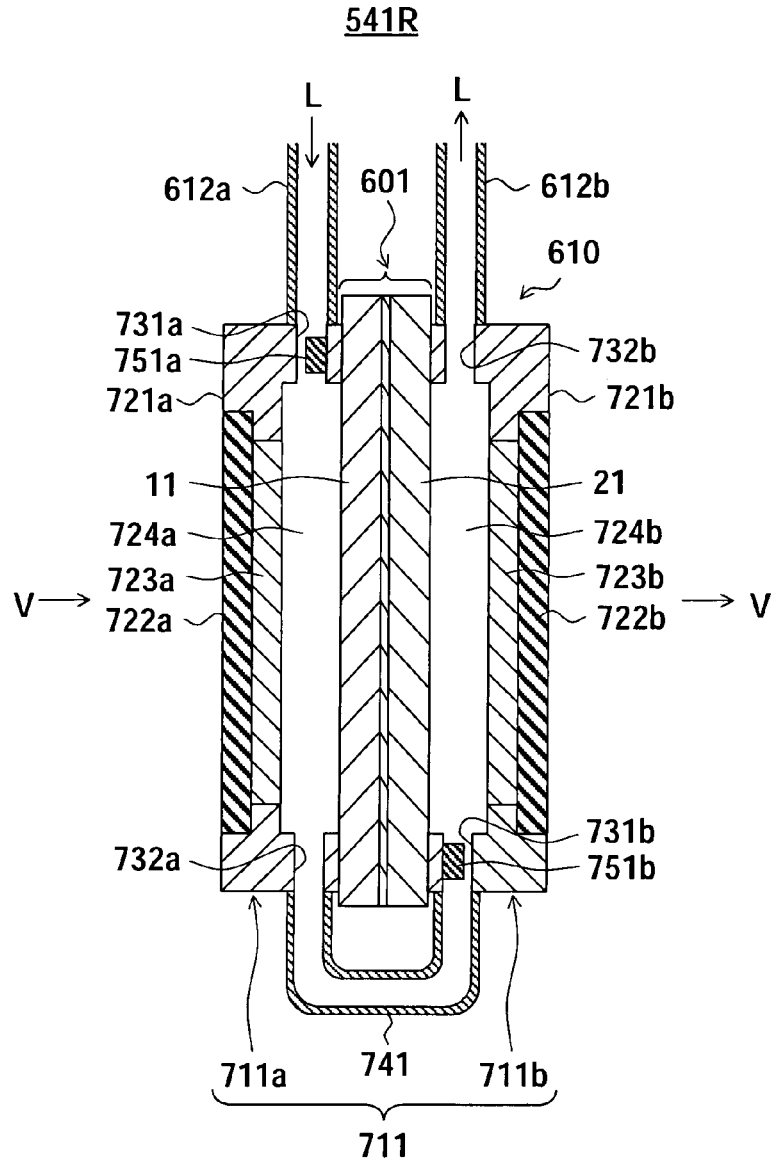
Figure 3B:
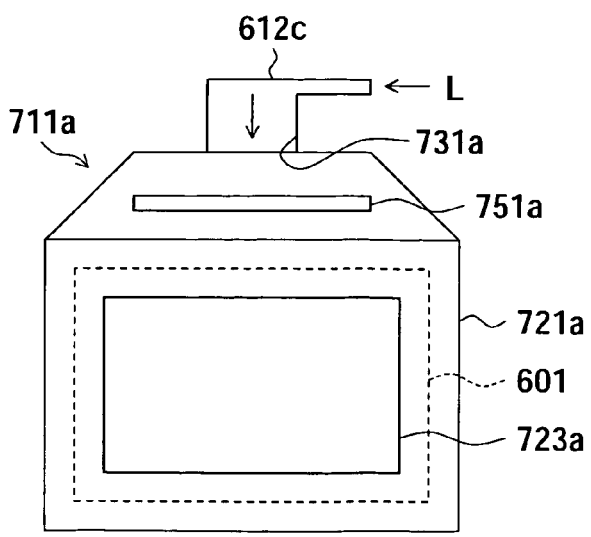

FIG. 2 is a plan view showing an enlarged portion of the first liquid crystal display unit 541R, the second liquid crystal display unit 541G, and the third liquid crystal display unit 541B in the liquid crystal display device 500 according to the present embodiment. FIGS. 3A and 3B are views showing the first liquid crystal display unit 541R, in which FIG. 3A is a cross-sectional view of the first liquid crystal display unit 541R and FIG. 3B is a plan view seem from a first cooling fluid receiving unit 711a side in the first liquid crystal display unit 541R. Note that, the second liquid crystal display unit 541G and the third liquid crystal display unit 541B are formed in the same way as the first liquid crystal display unit 541R as shown in FIGS. 3A and 3B.

As shown in FIG. 2, each of the first, second, and third liquid crystal display units 541R, 541G, and 541B is arranged and opposed to each light incident surfaces of the dichroic prism 561 being a cube. Each of the first, second, and third liquid crystal display units 541R, 541G, and 541B, as shown in FIG. 2 and FIGS. 3A and 3B, has the liquid crystal panel 601 and the cooling unit 610. The cooling unit 610 has a cooling fluid pump 611, a radiator 621, and a cooling fluid reserve tank 631 as shown in FIG. 2, and has a first and a second cooling fluid receiving units 711a and 711b as shown in FIG. 3A.

As shown in FIG. 2, the first liquid crystal display unit 541R is coupled with the cooling fluid pump 611 via a first pipe 612a, and coupled with the second liquid crystal display unit 541G via a second pipe 612b. The second liquid crystal display unit 541G is coupled with the third liquid crystal display unit 541B via a third pipe 612c. The third liquid crystal display unit 541B is coupled with the radiator 621 via a fourth pipe 612d. The radiator 621 is coupled with the cooling fluid reserve tank 631 via a fifth pipe 612e. And the cooling fluid reserve tank 631 is coupled with the cooling fluid pump 611 via a sixth pipe 612f.

The liquid crystal panel 601 will be described.

The liquid crystal panel 601 is cooled by the cooling fluid L in the cooling unit 610 from a surface to which the light is emitted from the light source 501. The liquid crystal panel 601, as described above, receives the light emitted from the light source 501 and modulates the same. In the present embodiment, as shown in FIG. 3A, the liquid crystal display device 500 displays the light emitted from the light source 501 through the liquid crystal panel 601 and the cooling fluid L in the cooling unit 610, as an image. Specifically, the liquid crystal panel 601 modulates the light V passed through the cooling fluid L received in the first receiving space 724a of the first cooling fluid receiving unit 711a in the cooling unit 610, and transmits the modulated light through the cooling fluid L received in the second receiving space 724b of the second cooling fluid receiving unit 711b in the cooling unit 610. Namely, the light emitted from the light source 501 is supplied from the first cooling fluid receiving unit 711a side through the liquid crystal panel 601 to the second cooling fluid receiving unit 711b side.

Figure 4:
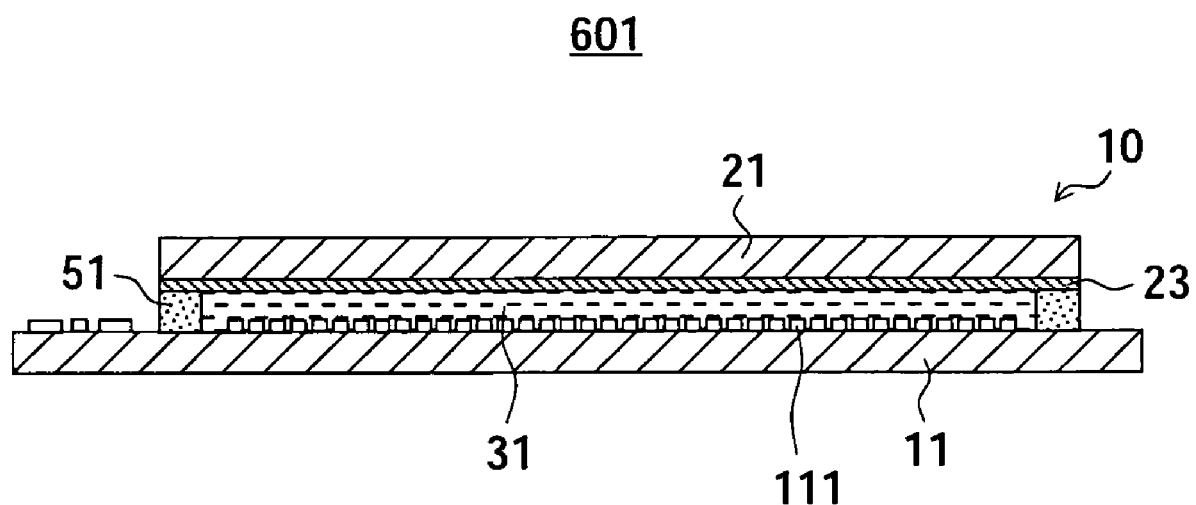
FIG. 4 is a cross-sectional view of a main portion of the liquid crystal panel according to the first embodiment of the present invention.
Figure 5:
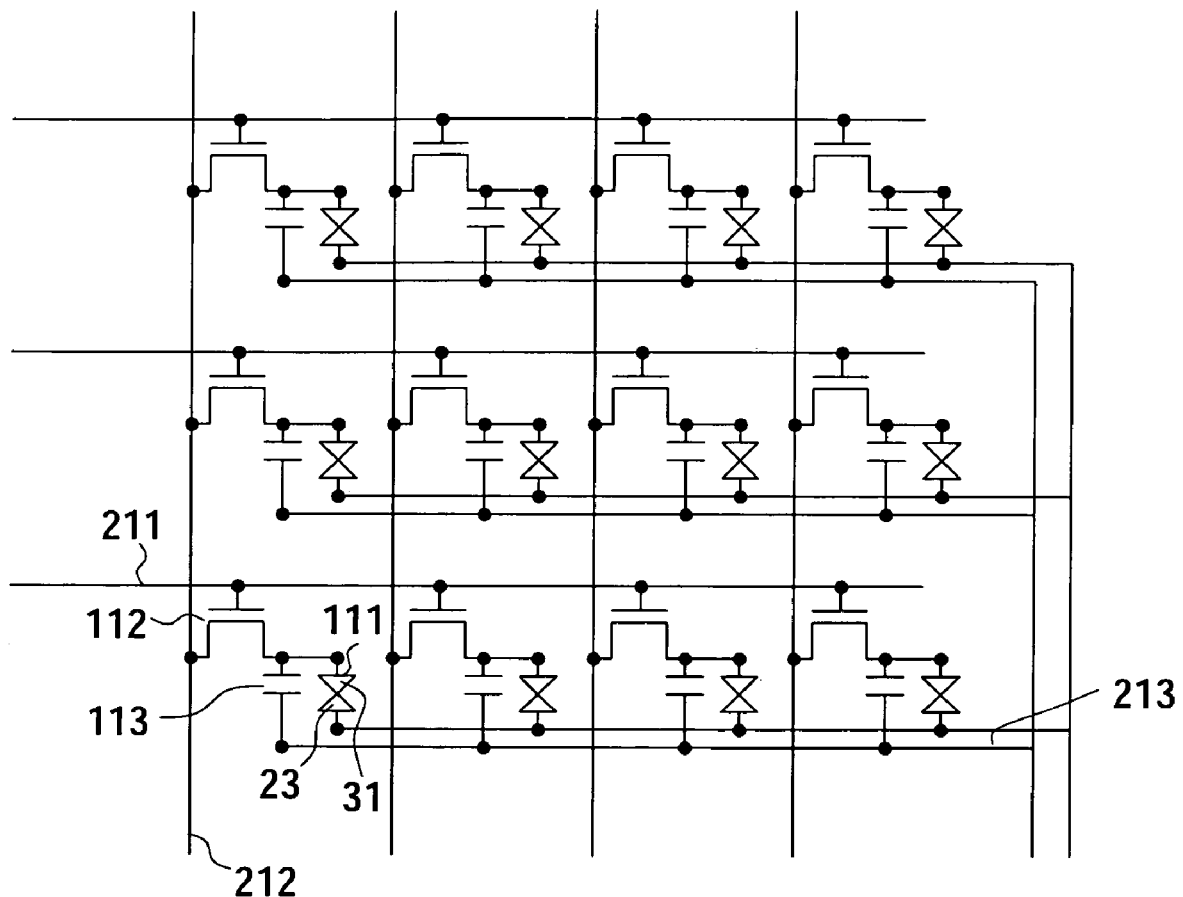
FIG. 5 is a circuit diagram of the liquid crystal panel according to the first embodiment of the present invention.
Figure 5:
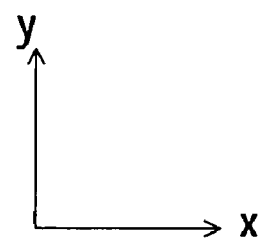

FIG. 4 and FIG. 5 are views showing a main portion of the liquid crystal panel 601 according to the present embodiment. Here, FIG. 4 is a cross-sectional view showing the main portion of the liquid crystal panel 601, and FIG. 5 is a block diagram of the liquid crystal panel 601.

As shown in FIG. 4 and FIG. 5, the liquid crystal panel 601 is an active matrix type, and includes an array substrate 11, a counter electrode 21, and a liquid crystal layer 31. The array substrate 11 and the counter substrate 21 are separately opposed each other. The surrounding thereof is sealed by a sealant 51. The liquid crystal layer 31 is arranged and sandwiched between the array substrate 11 and the counter substrate 21. The liquid crystal panel 601 according to the present embodiment is a transmissive type, and transmits the light emitted from the light source 501 from the array substrate 11 side to the counter substrate 21 side, for example. As shown in FIG. 3A, the liquid crystal panel 601 is fixed on the respective cooling fluid receiving units 711a and 711b of the cooling unit 610 around the respective surfaces of the array substrate 11 and the counter substrate 21 so as not to contact the cooling fluid L in the cooling unit 610 with the sealant 51. The respective units will be described successively.

The array substrate 11 is a transparent insulation substrate, for example, made of silica based glass (quartz). The array substrate 11, as shown in FIG. 3A, is arranged so that a surface being an opposed side to be contacted to the liquid crystal layer 31 is contacted to the cooling fluid L in the cooling unit 610. The surface to be contacted to the cooling fluid L is formed such that the maximum height Ry of the surface roughness is equal to or less than 2 μm. On the other hand, the other surface to be faced to the liquid crystal layer 31 is formed with a plurality of pixels in matrix, and has pixel electrodes 111 as shown in FIG. 4. The array substrate 11 has a pixel switching element 112, a retention volume element 113, a scanning line 211, a signal line 212, and a retention volume line 213, and the respective units are connected to the pixel electrode 111.

A plurality of the pixel electrodes 111 in the array substrate 11, as shown in FIG. 5, is separately arranged in matrix in a first direction x and a second direction y approximately perpendicular to the first direction x. The pixel electrode 111, for example, is made of indium tin oxide (ITO) and is transparent. Each of the pixel electrodes 111 is formed with the pixel switching element 112, and connected to a drain electrode thereof. The pixel electrode 111, as a display voltage, applies a data signal supplied through the pixel switching element 112 from the signal line 212 to the liquid crystal layer 31.

A plurality of the pixel switching elements 112, as shown in FIG. 5, is arranged in matrix in the first direction x and the second direction y approximately perpendicular to the first direction x. The pixel switching element 112 is formed as a top gate type thin film transistor (TFT), for example. The pixel switching element 112 is formed with a channel region by a semiconductor thin film transistor made of polysilicon. A gate electrode of the pixel switching element 112 is connected to the scanning line 211, so the pixel switching element 112 is driven and controlled in response to a scanning signal input though the scanning line 211 from a gate driver of a liquid crystal drive circuit unit 612 to the gate electrode. A source electrode thereof is connected to the signal line 212, so the pixel switching element 112 supplies the data signal though the signal line 212 from a source driver of the liquid crystal drive circuit unit 612 to the source electrode. A drain electrode thereof is connected to the pixel electrode 111 and the retention volume element 113, so the pixel switching element 112 supplies the data signal from the drain electrode to the pixel electrode 111 and the retention volume element 113 when the gate electrode is applied with the scanning signal to enter an on-state.

A plurality of the retention volume elements 113, as shown in FIG. 5, is arranged in matrix in the first direction x and the second direction y approximately perpendicular to the first direction x so as to correspond to each of the pixel electrodes 111. The retention volume element 113, for example, is formed to sandwich a dielectric film between the first electrode and the second electrode. In the retention volume element 113, a first electrode is connected to the drain electrode of the pixel switching element 112 and a second electrode is connected to the retention volume line 213. The retention volume element 113 is formed and connected in parallel to an electrostatic capacitance of the liquid crystal layer 31, and retains charges caused by the data signal applied to the liquid crystal layer 31.

The scanning line 211 is formed in the array substrate 11 so as to extend in the first direction x, and connected to the pixel switching elements 112 arranged in the first direction x. A plurality of the scanning lines 211 is separately arranged in the second direction y so as to correspond to the pixel switching element 112 arranged in the second direction y. The scanning line 211 is connected to the gate driver, so supplies the scanning signal from the gate driver to the pixel switching element 112 so as to select a row of the pixel electrode 111 successively in time division.

The signal line 212 is formed in the array substrate 11 so as to extend in the second direction y, and connected to the pixel switching element 112 arranged in the second direction y. A plurality of the signal lines 212 is separately arranged in the first direction x so as to correspond to the pixel switching element 112 arranged in the first direction x. The signal line 212 is connected to the source driver and supplies the data signal from the source driver to the pixel electrode 111 though the pixel switching element 112.

The retention volume line 213 is formed in the array substrate 11 so as to extend in the first direction x and connected to the retention volume element 113. A plurality of the retention volume lines 213 is separately arranged in the second direction y so as to correspond to the retention volume element 113 arranged in the second direction y. An end portion of the retention volume line 213 is connected to a second electrode 113b of the retention volume element 113 and the other end portion is connected to the counter electrode 23.

The counter substrate 21 is separately arranged and opposed to the array substrate 11. The array substrate 11 and the counter substrate 21, as shown in FIG. 4, are separately faced and sealed by the sealant 51 to thereby form a pair of substrates. The counter substrate 21, in the same way as the array substrate 11, is a transparent insulation substrate transmitting light, and, for example, made of quartz. The counter substrate 21, as shown in FIG. 3, is placed such that a surface opposed to a surface to be contacted to the liquid crystal layer 31 is contacted to the cooling fluid L in the cooling unit 610. The surface to be contacted to the cooling fluid L is formed such that the maximum height Ry of the surface roughness is equal to or less than 2 μm. Note that, the maximum height Ry is defined as a height from the minimum bottom to the maximum top by "JIS B0601-1994". The counter substrate 21, shown in FIG. 4, has the counter electrode 23.

Here, the counter electrode 23 is made of ITO on the entire counter substrate 21 as a common electrode being common in the pixel electrode 111.

The liquid crystal layer 31 is sandwiched and placed between the pixel electrode 111 on the array substrate 11 and the counter electrode 23 on the counter substrate 21. The liquid crystal layer 31, for example, is a twist nematic type and is aligned by alignment layers (not shown) formed on the array substrate 11 and the counter substrate 21. The liquid crystal layer 31 changes an alignment state in response to a voltage applied by the pixel electrode 111 and the counter electrode 23 to change an optical characteristic, and controls an image display.

The liquid crystal panel 601 of the first liquid crystal display unit 541R is formed as described above, in which the voltage is applied to the liquid crystal layer 31 by the pixel electrode and the common electrode to change the alignment of the liquid crystal molecules in the liquid crystal layer 31 and change the light transmittance to thereby display the image on the display area. In the present embodiment, the liquid crystal panel 601 of the first liquid crystal display unit 541R displays a red image, the liquid crystal panel 601 of the second liquid crystal display unit 541G displays a green image, and the liquid crystal panel 601 of the third liquid crystal display unit 541B displays a blue image.

Next, the cooling unit 610 will be described.

The cooling unit 610 has the cooling fluid pump 611, the radiator 621, and the cooling fluid reserve tank 631 as shown in FIG. 2, also, has the first and the second cooling fluid receiving units 711a and 711b and the first and the second flow path block units 751a and 751b as shown in FIG. 3A. The cooling unit 610 cools the surface of the liquid crystal panel 601 to which the light is emitted from the light source 501, by using the cooling fluid L through which the light emitted from the light source 501 passes. The liquid crystal display device 500 displays an image being the light from the light source 501 through the liquid crystal panel 601 and the cooling fluid L in the cooling unit 610. The respective units of the cooling unit 610 will be described successively.

The cooling fluid pump 611, for example, is a rotary pump, and is connected to the first, the second, and third liquid crystal display units 541R, 541G, and 541B by the first to sixth pipes 612a, 612b, 612c, 612d, 612e, and 612f as shown in FIG. 2. The cooling fluid pump 611 drains the cooling fluid L received in the first and the second cooling fluid receiving units 711a and 711b of the first, the second, and the third liquid crystal display units 541R, 541G, and 541B to the radiator 621. The cooling fluid pump 611 supplies the cooling fluid L radiated (dissipated) and cooled by the radiator 621 to the first and the second cooling fluid receiving units 711a and 711b in the respective display units. The cooling fluid pump 611, for example, uses a fluid with a low freezing point and a high transmittance as the cooling fluid L. For example, a fluid containing propylene glycol as a main component is used.

Specifically, the cooling fluid pump 611 supplies the cooling fluid L through the first pipe 612a to the first liquid crystal display unit 541R, and supplies the cooling fluid L supplied to the first liquid crystal display unit 541R though the second pipe 612b to the second liquid crystal display unit 541G. The cooling fluid pump 611 supplies the cooling fluid L supplied to the second liquid crystal display unit 541G though the third pipe 612c to the third liquid crystal display unit 541B. The cooling fluid pump 611 supplies the cooling fluid L supplied to the third liquid crystal display unit 541B through the fourth pipe 612d to the radiator 621. The cooling fluid pump 611 supplies the cooling fluid L supplied to the radiator 621 though the fifth pipe 612e to the cooling fluid reserve tank 631, and supplies the cooling fluid L received in the cooling fluid reserve tank 631 though the sixth pipe 612f. In this way, the cooling fluid pump 611 is connected to the first, the second, and the third liquid crystal display units 541R, 541G, and 541B, so circulates the cooling fluid L through the first and the second cooling fluid receiving units 711a and 711b of the first, the second, and the third liquid crystal display units 541R, 541G, and 541B.

In the first, the second, and the third liquid crystal display units 541R, 541G, and 541B respectively, the cooling fluid pump 611, for example, as shown in FIG. 3A, drains the cooling fluid L received in the first cooling fluid receiving unit 711a from the first drain port 732a, and supplies the cooling fluid L from the first feed port 731a to the first cooling fluid receiving unit 711a at the same time, which causes the first receiving space 724a to receive the cooling fluid L. Also, the cooling fluid pump 611 drains the cooling fluid L received in the second cooling fluid receiving unit 711b from the second drain port 732b, and supplies the cooling fluid L from the second feed port 731b to the second cooling fluid receiving unit 711b at the same time, which causes the second receiving space 724b to receive the cooling fluid L.

In the present embodiment, as shown in FIG. 3A, the first receiving space 724a of the first cooling fluid receiving unit 711a and the second receiving space 724b of the second cooling fluid receiving unit 711b are coupled by a coupling pipe 741. The cooling fluid pump 611 supplies the cooling fluid L from the first feed port 731a to the first cooling fluid receiving unit 711a, and supplies the cooling fluid L received in the first fluid receiving unit 711a through the coupling pipe 741 to the second cooling fluid receiving unit 711b at the same time. Also, the cooling fluid pump 611 drains the cooling fluid L received in the second fluid receiving unit 711b from the second feed port 732b at the same time.

The radiator 621 includes a heat radiating fin and radiates (dissipates) a conducted heat to outside air by using the heat radiating fin. In the preset embodiment, the radiator 621 receives the cooling fluid L received in the respective cooling fluid receiving units 711a and 711b of the first, the second, and the third liquid crystal display units 541R, 541G, and 541B based on a circulation operation performed by the cooling fluid pump 611, and radiates (dissipates) the heat of the cooling fluid L to cool the same. The radiator 621 supplies the radiated (dissipated) cooling fluid L through the fifth pipe 612e to the cooling fluid reserve tank 631. The cooling fluid L is supplied to each of the cooling fluid receiving units 711a and 711b by the cooling fluid pump 611.

The cooling fluid reserve tank 631 is a container for keeping the cooling fluid L. The cooling fluid reserve tank 631 receives the cooling fluid L radiated (dissipated) by the radiator 621 from the fifth pipe 612e and keeps the predetermined amount of the cooling fluid L while retaining a cooled state. The cooling fluid reserve tank 631 supplies the received cooling fluid L from the sixth pipe 612f to the cooling fluid pump 611.

Each of the first and the second cooling fluid receiving units 711a and 711b is a container provided with each of the first and second receiving space 424a and 424b for receiving the cooling fluid L, in which the received cooling fluid L contacts and cools the liquid crystal panel 601. The respective units will be described successively.

The first cooling fluid receiving unit 711a, as shown in FIG. 3A, has a first outer frame 721a, a first polarizing plate fixing substrate 711a, and the first polarizing plate 723a. The first polarizing fluid receiving unit 711a is formed with a first feed port 731a to which the cooling fluid L is supplied and a first drain port 732a from which the cooling fluid L is drained, and receives the cooling fluid L supplied from the first feed port 731a at the first receiving space 724a.

The first cooling fluid receiving unit 711a is formed with the first receiving space 724a at a surface of the liquid crystal panel 601 to which the light is emitted from the light source 501 to transmit the light emitted from the light source 501 in the cooling fluid L received in the first receiving space 724a. The first receiving space 724a of the first cooling fluid receiving unit 711a, for example, is opposed to the liquid crystal panel 601 so as to cover the surface thereof to which the light emitted from the light source 501 is emitted. The first cooling receiving unit 711a cools the liquid crystal panel 601 by using the cooling fluid L received in the first receiving space 724a. Also, the first cooling fluid receiving unit 711a cools the first polarizing plate 723a opposed via the first receiving space 724a to the liquid crystal panel 601, by using the cooling fluid L received in the first receiving space 724a.

Specifically, as shown in FIG. 3A, the first cooling fluid receiving unit 711a receives the cooling fluid L supplied from the first feed port 731a in the first receiving space 724a, and contacts the cooling fluid L to the liquid crystal panel 601 and the first polarizing plate 723a to cool the liquid crystal panel 601 and the first polarizing plate 723a. In the case of the first liquid crystal display unit 541R, for example, the first cooling fluid receiving unit 711a receives the cooling fluid L supplied from the cooling fluid pump 611 though the first pipe 612a at the first feed port 731a. The first cooling fluid receiving unit 711a keeps the cooling fluid L supplied from the cooling fluid pump 611 in the first receiving space 724a, and contacts the same to the liquid crystal panel 601 and the first polarizing plate 723a to thereby cool the liquid crystal panel 601 and the first polarizing plate 723a. The first cooling fluid receiving unit 711a drains the cooling fluid L kept in the first receiving space 724a from the first drain port 732a through the coupling pipe 741 to the second cooling fluid receiving unit 711b. The respective units of the first cooling fluid receiving unit 711a will be described.

The first outer frame 721a encloses the surround of the display area of the liquid crystal panel 601 to support and fix the liquid crystal panel 601, preferably by using a flexible and low water vapor permeability adhesive such as a silicon-based resin adhesive. Specifically, an adhesive layer is formed so as to be equal to or greater than 0.5 mm in the width and 100 μm in the thickness, and then the liquid crystal panel 601 is fixed to the first outer frame 721a.

As shown in FIG. 3A, the first outer frame 721a is opened in a rectangle shape such that the light emitted from the light source 501 is emitted through the cooling fluid L in the first receiving space 724a to the display area of the liquid crystal panel 601. The first polarizing plate fixing substrate 722a and the first polarizing plate 723a through which the light V emitted from the light source 501 passes, are placed in the opening of the first outer frame 721a to cover the first receiving space 724a receiving the cooling fluid L to thereby form a closed space. The width in the first receiving space 724a defined by a distance between the liquid crystal panel 601 and the first polarizing plate 723a, for example, is defined so as to be equal to or less than 5 mm. The first outer frame 721a is formed by a resin material or a metal material, for example, by aluminum being a metal material having a high thermal conductivity in this case.

The first outer frame 721*a* is formed with the first feed port 731*a* and the first drain port 732*a* to couple the same to the first receiving space 724*a*. The first feed port 731*a* is provided at a side surface of the first outer frame 721 to supply the cooling fluid L from the side surface side to the other side surface side in the liquid crystal panel 601 in the rectangle shape. For example, the first feed port 731*a* is provided at a middle portion of the side surface of the first outer frame 721 so as to correspond to a middle portion of the liquid crystal panel 601. On the other hand, the first drain port 732*a* is provided at the other side surface of the first outer frame 721*a* to drain the cooling fluid L supplied from the side surface side to the other side surface side in the liquid crystal panel 601 in the rectangle shape. For example, the first drain port 732*a* is provided at a middle portion of the other side surface of the first outer frame 721 so as to correspond to a middle portion of the liquid crystal panel 601.

The first polarizing plate fixing substrate 722*a* is a substrate for fixing the first polarizing plate 723*a*. The first polarizing plate fixing substrate 722*a* is a transparent substrate, for example, formed by a soda-lime glass. The first polarizing plate fixing substrate 722*a* is placed in the opening of the first outer frame 721*a*, and fixes and supports the first polarizing plate 723*a* at a surface of the liquid crystal panel 601 side. The first polarizing plate fixing substrate 722*a* is provided such that the light V emitted from the light source 501 passes through and the passed light is emitted through the first polarizing plate 723*a* to the liquid crystal panel 601.

The first polarizer plate 723*a* is placed and fixed to the first polarizing plate fixing substrate 722*a* so as to be opposed to the liquid crystal panel 601 through the first receiving space 724*a*, and polarizes the light V emitted from the light source 501 to the liquid crystal panel 601. The polarizing plate 723*a*, for example, polarizes the emitted light to a linearly polarized light. The first polarizing plate 723*a*, for example, uses a colored polyvinyl alcohol (PVA) film for a polarizing element of which a cellulose triacetate (TAC) film for protecting the PVA film is provided at both sides. The first polarizing plate 723*a*, along with the liquid crystal panel 601, is cooled by the cooling fluid L received in the first receiving space 724*a*.

The second cooling fluid receiving unit 711*b*, as shown in FIG. 3A, has a second outer frame 721*b*, a second polarizing plate fixing substrate 722*b*, and the second polarizing plate 723*b*. The second cooling fluid receiving unit 711*b* is formed with a second feed port 731*b* to which the cooling fluid L is supplied and a second drain port 732*b* from which the cooling fluid L is drained, and receives the cooling fluid L supplied from the second feed port 731*b* at the second receiving space 724*b*.

The second cooling fluid receiving unit 711*b* is formed with the second receiving space 724*b* at the other surface of the liquid crystal panel 601 to which the light is emitted from the light source 501. The second receiving space 724*b* of the second cooling fluid receiving unit 711*b*, for example, is opposed to the liquid crystal panel 601 so as to cover the other surface thereof. The second cooling fluid receiving unit 711*b* receives the light emitted from the light source 501 via the first receiving space 724*a* and the liquid crystal panel 601, and transmits the light emitted from the light source 501 in the cooling fluid L received in the second receiving space 724*b*. Namely, the second cooling fluid receiving unit 711*b* is placed to oppose the first cooling fluid receiving unit 711*a* via the liquid crystal panel 601. The second cooling receiving unit 711*b* cools the liquid crystal panel 601 by using the cooling fluid L received in the second receiving space 724*b*. Also, the second cooling fluid receiving unit 711*b* cools the second polarizing plate 723*b* opposed to the liquid crystal panel 601 via the second receiving space 724*b*, by using the cooling fluid L received in the second receiving space 724*b*.

Specifically, as shown in FIG. 3A, the second cooling fluid receiving unit 711*b* receives the cooling fluid L supplied from the second feed port 731*b* in the second receiving space 724*b*, and contacts the cooling fluid L to the liquid crystal panel 601 and the second polarizing plate 723*a* to thereby cool the liquid crystal panel 601 and the second polarizing plate 723*a*. In the case of the first liquid crystal display unit 541R, for example, the second cooling fluid receiving unit 711*b* receives the cooling fluid L supplied from the first cooling fluid receiving unit 711*a*, though the coupling pipe 741 from the second feed port 731*b*. The second cooling fluid receiving unit 711*b* keeps the cooling fluid L supplied from the first cooling fluid receiving unit 711*a* in the second receiving space 724*a*, and contacts and cools the liquid crystal panel 601 and the second polarizing plate 723*b* by the cooling fluid L. The second cooling fluid receiving unit 711*b* drains the cooling fluid L kept in the second receiving space 724*b* from the second drain port 732*b*. In the present embodiment, as shown in FIG. 2, the second cooling fluid receiving unit 711*b* of the first liquid crystal display unit 541R drains the cooling fluid L through the second pipe 612*b* to the second liquid crystal display unit 541G.

The second outer frame 721*b* is formed in the same way as the first outer frame 721*a*. The second outer frame 721*b* encloses the surround of the display area of the liquid crystal panel 601 to support and fix the liquid crystal panel 601. As shown in FIG. 3A, the second outer frame 721*b* is opened in a rectangle shape so as to transmit the light emitted through the cooling fluid L of the first receiving space 724*a* to the display area of the liquid crystal panel 601 and modulated by the liquid crystal panel 601. The second polarizing plate fixing substrate 722*b* and the second polarizing plate 723*b* through which the light V modulated by the liquid crystal panel 601 passes, are placed in the opening of the second outer frame 721*b* to cover the second receiving space 724*b* receiving the cooling fluid L. The second outer frame 721*b* is formed with the second feed port 731*b* and the second drain port 732*b* to which the second receiving space 724*b* is connected.

The second polarizing plate fixing substrate 722*b*, formed in the same way as the first polarizing plate fixing substrate 722*a*, fixes the second polarizing plate 723*b*. The second polarizing plate fixing substrate 722*b* is placed in the opening of the second outer frame 721*b*, and fixes and supports the second polarizing plate 723*b* at a surface of the liquid crystal panel 601 side. The second polarizing plate fixing substrate 722*b* transmits the light V modulated by the liquid crystal panel 601 and polarized by the second polarizing plate 723*b*.

The second polarizer plate 723*b* is formed in the same way as the first polarizing plate 723*a*. The second polarizer plate 723*b* is fixed to the second polarizing plate fixing substrate 722*b* so as to be opposed to the liquid crystal panel 601 through the second receiving space 724*b*. The second polarizing plate 723*b*, along with the liquid crystal panel 601, is cooled by the cooling fluid L received in the second receiving space 724*b*. The second polarizing plate 723*b* receives the light V modulated by the liquid crystal panel 601 through the cooling fluid L in the second receiving space 724*b* and polarizes the same.

The coupling pipe 741 includes a pipe guiding the cooling fluid L. The coupling pipe 741, for example, couples the first drain port 732*a* of the first cooling fluid receiving unit 711*a* and the second feed port 731b of the second cooling fluid receiving unit 711b so that the cooling fluid L passes between the first receiving space 724a of the first cooling fluid receiving unit 711a and the second receiving space 724b of the second cooling fluid receiving unit 711b. The coupling pipe 741 guides the cooling fluid L kept in the first receiving space 724a of the first cooling fluid receiving unit 711a to the second receiving space 724b of the second cooling fluid receiving unit 711b.

Next, the first and the second flow path block units 751a and 751b of the cooling unit 610 will be described.

Each of the first and the second flow path block units 751a and 751b, as shown in FIG. 3A, is formed into a protrusion shape (projection form) in the respective cooling fluid receiving units 711a and 711b. The first and the second flow path block units 751a and 751b are placed in the respective cooling fluid receiving units 711a and 711b and opposed to the respective feed ports 731a and 731b. The first and the second flow path block units 751a and 751b are formed at positions closer to the pipes 612a and 741 than regions of the respective receiving spaces 724a and 724b corresponding to the liquid crystal panel 601. Each of the first and the second flow path block units 751a and 751b blocks a part of the flow path of the cooling fluid L supplied by the cooling fluid pump 611 from each of the feed ports 731a and 731b of the cooling fluid receiving units 711a and 711b to each region of the receiving spaces 724a and 724b corresponding to the liquid crystal panel 601, to prevent air bubbles from entering the display area of the liquid crystal panel 601. The respective first and the second flow path block units 751a and 751b are integrally formed in the respective cooling fluid receiving units 711a and 711b by using the same material.

The respective first and the second flow path block units 751a and 751b will be described.

The first flow path block unit 751a, as shown in FIG. 3A, blocks a part of the flow path of the cooling fluid L supplied by the cooling fluid pump 611 from the first feed port 731a of the first cooling fluid receiving unit 711a to the region of the first receiving space 724a corresponding to the liquid crystal panel 601. A surface of the first flow path block unit 751a blocking the cooling fluid L is formed such that the maximum height Ry of the surface roughness is equal to or less than 10 μm. The maximum height Ry of the surface roughness is preferably small value, so, in the present embodiment, more preferably, it is formed in less than 5 μm. For example, a metal thin film made from chromium is provided on the surface of the first flow path block unit 751a by plating treatment to make the maximum height Ry of the surface roughness less than 5 μm. Note that, as the metal thin film other than chromium, titanium, silicon oxide, and magnesium oxide are preferably used in terms of preventing a deterioration of the image quality due to a light diffused reflection.

The first flow path block unit 751a, as shown in FIG. 3A, is provided in a position opposed to the first feed port 731a. In a region other than the above position opposed to the first feed port 731a, openings are formed, so the cooling fluid L is supplied through the openings to the first receiving space 724a. The openings are formed at both end portions of the first flow path block unit 751a. The first flow path block unit 751a, for example, is formed in the rectangle shape, has a blocking surface approximately perpendicular to a flow direction of the cooling fluid L supplied from the first feed port 731a, and is formed such that the blocking surface area is larger than a section of the first feed port 731a to cover a region corresponding to the first feed port 731a. The first flow path block unit 751a blocks the flow of the cooling fluid L supplied from the first feed port 731a at the blocking surface perpendicular to the flow direction, and guides the cooling fluid L to the openings at the both end portions, which allows the first receiving space 724a to receive the cooling fluid L.

The second flow path block unit 751b, as shown in FIG. 3A, blocks a part of the flow path of the cooling fluid L supplied by the cooling fluid pump 611 from the second port 731b of the second cooling fluid receiving unit 711b to the region of the second receiving space 724b corresponding to the liquid crystal panel 601. The second flow path block unit 751b is formed in the same way as the first flow path block unit 751a shown in FIG. 3B, and is provided in a position opposed to the second feed port 731b. In a region other than the above position opposed to the second feed port 731b, openings are formed, so the cooling fluid L is supplied through the openings to the second receiving space 724b.

Next, an operation of the liquid crystal display device 500 according to the present embodiment will be described.

In the liquid crystal display device 500 according to the present embodiment, as shown in FIG. 1, the white light emitted by from the light source 501 passes through the first lens array 503, is reflected at the first reflection mirror 504, passes through the second lens array 505, and is divided by the first and the second dichroic mirrors 511 and 521 into the primary colors. For example, the first dichroic mirror 511 divides the white light to transmit the red light and to reflect a light mixed the green light and the blue light. The second dichroic mirror 521 divides the light mixed with the blue light and the green light to transmit the blue light and to reflect the green light.

The red light divided by the first dichroic mirror 511 is reflected at the second reflection mirror 512, and is emitted through the second condenser lens 551R to the display area of the first liquid crystal display unit 541R. The green light divided by the second dichroic mirror 521 is emitted through the third condenser lens 551G to the display area of the second liquid crystal display unit 541G. The blue light divided by the second dichroic mirror 521 is emitted through the first relay lens 531, the third reflection mirror 532, the second relay lens 533, the fourth reflection mirror 534, and the third condenser lens 551B to the display area of the third liquid crystal display unit 541B. Since a light path length of the blue light differs from other color lights, the light path is adjusted by the first and the second relay lenses 531 and 533 to prevent color heterogeneity (blur). The respective lights emitted to the liquid crystal panels 601 of the liquid crystal display units 541R, 541G, and 541B are modulated by each of the liquid crystal panels 601 on which an image corresponding to the respective colors is displayed, and pass through the panels. The respective color images are combined by the dichroic prism 561 to become an image. The image is enlarged and projected by the projection lens unit 571 on the screen 580.

When the projection type liquid crystal display device 500 according to the present embodiment projects and displays an image on the screen 580, most of the light supplied from the light source 501, not applied to the image projected and displayed on the screen 580, is absorbed into configuration members of the respective liquid crystal display units 541R, 541G, and 541B to generate heat in the configuration member such as the liquid crystal panel 601 and the first and the second polarizing plates 723a and 723b.

The cooling unit 610 cools the liquid crystal panel 601 and the first and the second polarizing plates 723a and 723b in which the light emitted from the light source 501 is converted to generate the heat.

In the cooling unit 610, the first and second cooling fluid receiving units 711a and 711b receive the cooling fluid L supplied from the feed ports 731*a* and 731*b* in the receiving spaces 724*a* and 724*b* to cool the display area of the liquid crystal panel 601. For example, the cooling fluid pump 611 drains the cooling fluid L received in the cooling fluid receiving units 711*a* and 711*b* from the drain ports 732*a* and 732*b*. Also, the cooling fluid pump 611 supplies the cooling fluid L from the feed ports 731*a* and 731*b* to the cooling fluid receiving units 711*a* and 711*b*, which allows the receiving spaces 724*a* and 724*b* to receive the cooling fluid L.

In the above case, each of the flow path block units 751*a* and 751*b* blocks a part of the flow path of the cooling fluid L supplied by the cooling fluid pump 611 from each of the feed ports 731*a* and 731*b* to the region of each of the cooling fluid receiving units 711*a* and 711*b* corresponding to the liquid crystal panel 601. Therefore, the cooling fluid L is supplied to the receiving spaces 724*a* and 724*b* while the air bubbles therein are dispersed by the flow path block units 751*a* and 751*b*, and the flow path of the cooling fluid L supplied from each of the feed port 731*a* and 731*b* is changed to the surround of each of the flow path block unit 751*a* and 751*b*. The air bubbles in the cooling fluid L flow in the receiving spaces 724*a* and 724*b* along a flow path changed by each of the flow path block unit 751*a* and 751*b*, and are drained from each of the drain ports 732*a* and 732*b*.

As described above, in the liquid crystal display device 500 according to the present embodiment, the cooling fluid L is supplied to the receiving spaces 724*a* and 724*b* while the air bubbles therein are dispersed by the first and the second flow path block units 751*a* and 751*b*. The flow path of the cooling fluid L supplied from each of the feed ports 731*a* and 731*b* is changed to the surround of each of the flow path block units 751*a* and 751*b*. In this case, since a specific gravity (density) of the air bubble in the cooling fluid L is smaller than that of the cooling fluid L, the air bubbles flow in a region other than the display area of each of the receiving spaces 724*a* and 724*b* along the flow path changed by each of the flow path block units 751*a* and 751*b*, and is drained from each of the drain ports 732*a* and 732*b*. Therefore, when the liquid crystal panel 601 is cooled and adjusted in an rated temperature range, a noise and a production cost can be suppressed and the influence of the air bubbles generated in the cooling fluid L due to the circulation of the cooling fluid L upon the image quality can be eliminated, consequently, the image quality can be improved.

In the present embodiment, the polarizing plates 723*a* and 723*b* are placed and opposed to the liquid crystal panel 601 through the cooling fluid L, and the cooling unit 610 cools the liquid crystal panel 601 and the respective polarizing plates 723*a* and 723*b*. Therefore, in the liquid crystal display device 500 according to the present embodiment, since an effective cooling is possible, the noise and the production cost can be suppressed, relatively of the device can be improved and the image quality can be improved.

In the present embodiment, the cooling fluid pump 611 supplies the cooling fluid L from the first feed port 731*a* of the first cooling fluid receiving unit 711*a* to the first receiving space 724*a*, also, supplies the cooling fluid L received in the first cooling fluid receiving unit 711*a* from the first drain port 732*a* through the coupling pipe 741 to the second feed port 732*b* of the second cooling fluid receiving unit 711*b*, and drains the cooling fluid L received in the second cooling fluid receiving unit 711*b* from the second drain port 732*b*. The first cooling fluid receiving unit 711*a* in which the cooling fluid is kept in the first receiving space 724*a*, cools the liquid crystal panel 601 from the surface thereof, and the second cooling fluid receiving unit 711*b* in which the cooling fluid is kept in the second receiving space 724*b*, cools the liquid crystal panel 601 from the other surface. Therefore, in the liquid crystal display device according to the present embodiment, since an effective cooling is possible, the noise and the production cost can be suppressed, relatively of the device can be improved and the image quality can be improved.

In the present embodiment, the light emitted from the light source 501 is emitted to a first cooling fluid receiving unit 711*a* side to which the cooling fluid L is supplied first, then is emitted through the liquid crystal panel 601 to a second cooling fluid receiving unit 711*b* to which the cooling fluid L is supplied next to the first cooling fluid receiving unit 711*a*. In this way, the surface of the liquid crystal panel 601 to which the light supplied from the light source 501 is emitted first to easily generate heat, is cooled by the first cooling fluid receiving unit 711*a* to which the cooling fluid L is supplied first by the cooling fluid pump 611. The other surface of the liquid crystal panel 601 to which the light supplied from the light source 501 is emitted after the surface to hardly generate heat, is cooled by the second cooling fluid receiving unit 711*b* to which the cooling fluid L is supplied next to the first cooling fluid receiving unit 711*a*. Therefore, in the liquid crystal display device according to the present embodiment, since an effective cooling is possible, the noise and the production cost can be suppressed, relatively of the device can be improved and the image quality can be improved.

In the present embodiment, the cooling fluid pump 611 drains the cooling fluid L received in the cooling fluid receiving units 711*a* and 711*b* to the radiator 621. The radiator 621 radiates (dissipates) the heat of the cooling fluid L received in the cooling fluid receiving units 711*a* and 711*b* to cool the cooling fluid L. The cooling fluid L cooled by the radiator 621 is supplied to the cooling fluid receiving units 711*a* and 711*b*. Therefore, in the liquid crystal display device 500 according to the present embodiment, since an effective cooling is possible, the noise and the production cost can be suppressed, relatively of the device can be improved and the image quality can be improved.

In the present embodiment, the surface of each of the flow path block units 751*a* and 751*b* blocking the cooling fluid L, is formed such that the maximum height Ry of the surface roughness is equal to or less than 10 μm. If the maximum height Ry of the surface roughness is over 10 μm, the air bubbles in the cooling fluid L may adhere to the respective flow path block units 751*a* and 751*b* and the adhered bubbles may be coupled each other to generate a large bubble to thereby deteriorate the image quality. However, in the present embodiment, since the surface of each of the flow path block units 751*a* and 751*b* blocking the cooling fluid L is formed such that the maximum height Ry of the surface roughness is equal to or less than 10 μm, the above disadvantages are reduced. Therefore, the image quality can be improved.

In the present embodiment, the surface of the liquid crystal panel 601 to be contacted to the cooling fluid L is formed such that the maximum height Ry of the surface roughness is equal to or less than 2 μm. If the maximum height Ry of the surface roughness is over 2 μm, the bubbles in the cooling fluid L may adhere to the respective flow path block units 751*a* and 751*b* to thereby deteriorate the image quality. However, in the present embodiment, since the surface of the liquid crystal panel 601 to be contacted to the cooling fluid L is formed such that the maximum height Ry of the surface roughness is equal to or less than 2 μm, the above disadvantages are reduced. Therefore, the image quality can be improved.

Second Embodiment

Figure 6A:
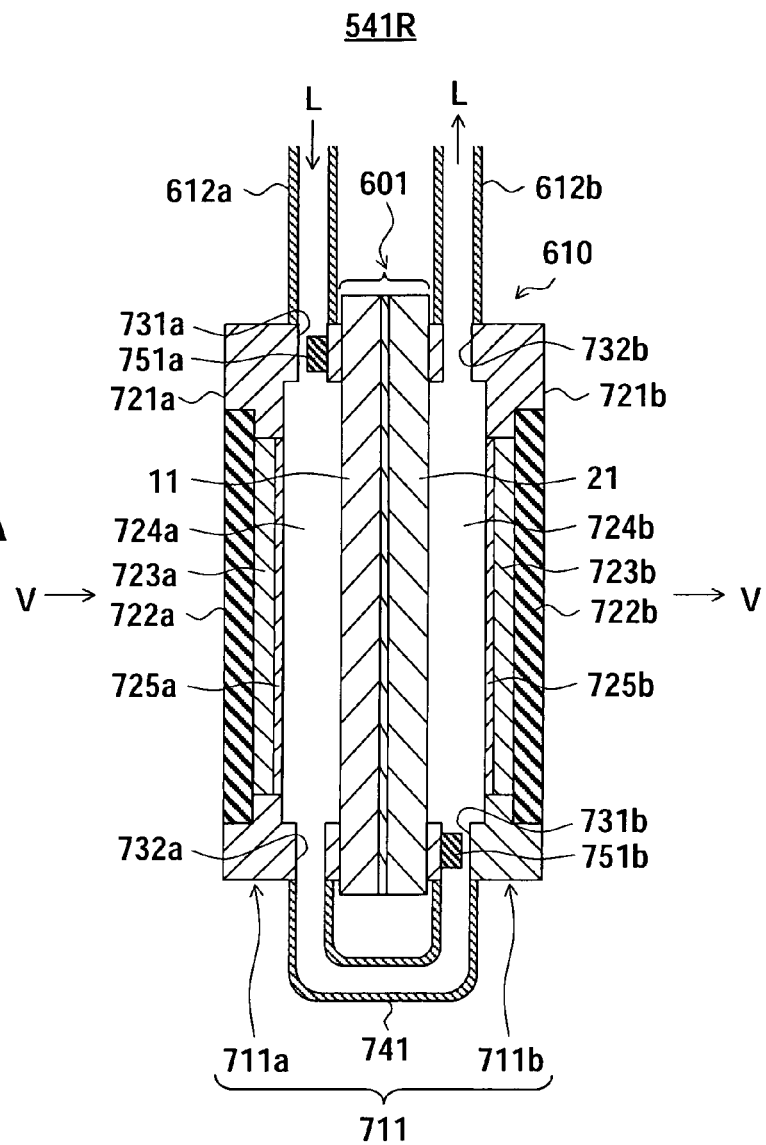
Figure 6B:
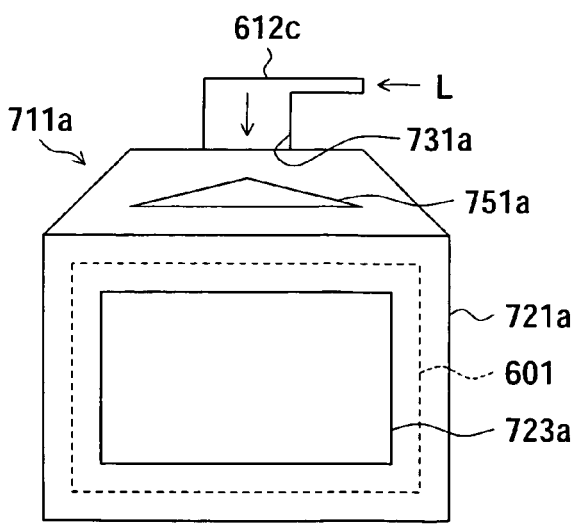
Figure 7:
FIG. 7 is a cross-sectional view of a surface of a flow path block unit of a cooling unit.

FIGS. 6A and 6B are views showing the first liquid crystal display unit 541R of the liquid crystal display device according to the present embodiment, in which FIG. 6A is a cross-sectional view of the first liquid crystal display unit 541R and FIG. 6B is a plan view seem from the first cooling fluid receiving unit 711a side in the first liquid crystal display unit 541R. Note that, the second liquid crystal display unit 541G and the third liquid crystal display unit 541B are formed in the same way as the first liquid crystal display unit 541R as shown in FIGS. 6A and 6B.

As shown in FIGS. 6A and 6B, the liquid crystal display device 500 according to the present embodiment is the same configuration as the first embodiment except that a first and a second polarizing plate protection units 725a and 725b are included and shapes of the first and the second flow path block units 751a and 751b are different. Therefore, components the same as those of the first embodiment are assigned the same notations and explanations thereof are omitted.

The first and the second polarizing protection plate units 725a and 725b, as shown in FIG. 6A, are provided in the first cooling fluid receiving unit 711a and the second cooling fluid receiving unit 711b respectively. For example, as each of the polarizing plate protection units 725a and 725b, a titanium thin film is formed on a surface of each of the polarizing plates 723a and 723b.

Specifically, the first polarizing protection unit 725a is provided at the first receiving space 724a side of the first polarizing 723a to protect the first polarizing plate 723a from a contact with the cooling fluid L received in the first receiving space 724a. Namely, the first polarizing plate protection unit 725a is formed to cover a surface of the first polarizing plate 723a being the cooling fluid L side to thereby avoid that the cooling fluid L received in the first receiving space 724a and the first polarizing plate 723a are directly contacted. The first polarizing plate 723a is cooled via the first polarizing plate protection unit 725a by the cooling fluid L received in the first receiving space 724a.

The second polarizing protection unit 725b is provided at the second receiving space 724b side of the second polarizing 723b to protect the second polarizing plate 723b from a contact with the cooling fluid L received in the second receiving space 724b. Namely, the second polarizing plate protection unit 725b is formed to cover a surface of the second polarizing plate 723b being the cooling fluid L side to thereby avoid that the cooling fluid L received in the second receiving space 724b and the second polarizing plate 723b are directly contacted. The second polarizing plate 723b is cooled via the second polarizing protection unit 725b by the cooling fluid L received in the second receiving space 724b.

The first and the second polarizing protection plate units 725a and 725b, as shown in FIG. 6A, in the same way as the first embodiment, are provided in the first cooling fluid receiving unit 711a and the second cooling fluid receiving unit 711b respectively. However, in the present embodiment, as shown in FIG. 6B, a shape of the first flow path block unit 751a, differing from that of the first embodiment, is formed such that a region blocking the flow path of the cooling fluid L becomes large along the flow direction of the cooling fluid L supplied by the cooling fluid pump 611 from the first feed port 731a to the first cooling fluid receiving unit 711a. Namely, the first flow path block unit 751a is provided with the block surface blocking the flow path of the cooling fluid L so as to slope down along the flow direction from the plane approximately perpendicular to the flow direction of the cooling fluid L supplied from the first feed port 731a. The first flow path block unit 751a blocks the flow of the cooling fluid L supplied from the first feed port 731a at the block surface sloping along the flow direction, and guides the same to the openings at the both end portion, which allows the first receiving space 724a to receive the cooling fluid L.

Specifically, the first flow path block unit 751a, as shown in FIG. 6B, is formed such that a section cut at a plane being along the flow direction of the cooling fluid L from the first feed port 731a is a triangle shape. For example, the first flow path block unit 751a is formed in an isosceles triangle with two equal sides, and arranged such that the apex being a crossed point of the two equal sides is opposed to a middle portion of the first feed port 731a. Namely, the block surface of the first flow path blocking unit 751a blocking the flow path of the cooling fluid L is formed so as to become large from the middle portion of the first feed port 731a to the surroundings along the flow direction of the cooling fluid L supplied by the cooling fluid pump 611 from the first feed port 731a to the first cooling fluid receiving unit 711a. Note that, the second flow path block unit 751b is formed in the same way as the first flow path block unit 751a shown in FIG. 6B.

As described above, in the liquid crystal display device 500 according to the present embodiment, the first polarizing plate protection unit 725a protects the first polarizing plate 723a to prevent the same from contacting the cooling fluid L in the first receiving space 724a. The cooling fluid L in the cooling unit 610 cools the first polarizing plate 723a via the first polarizing plate protection unit 725a. The second polarizing plate protection unit 725b protects the second polarizing plate 723b to prevent the same from contacting the cooling fluid L in the second receiving space 724b. The cooling fluid L in the cooling unit 610 cools the second polarizing plate 723b via the second polarizing plate protection unit 725b. The first and the second polarizing plate protection units 725a and 725b protect the first and the second polarizing plates 723a and 723b respectively from a deterioration due to a permeation of the cooling fluid L. Therefore, in the present embodiment, the first and the second polarizing plate protection units 725a and 725b can prevent the deterioration to improve the image quality.

According to the present embodiment, the first flow path blocking unit 751a is formed such that the block surface region blocking the flow path of the cooling fluid L becomes large along the flow direction of the cooling fluid L supplied by the cooling fluid pump 611 from the first feed port 731a to the first cooling fluid receiving unit 711a, and the second flow path blocking unit 751b is formed such that the block surface region blocking the flow path of the cooling fluid L becomes large along the flow direction of the cooling fluid L supplied by the cooling fluid pump 611 from the second feed port 731b to the second cooling fluid receiving unit 711b. Therefore, according to the present embodiment, the strength that the cooling fluid L supplied from the feed ports 731a and 731b are blocked by the flow path block unit 751a and 751b is reduced, the combination of the bubbles in the cooling fluid L can be provided, and the flow path of the cooling fluid L can be changed around the flow path block units 751a and 751b. Therefore, the deterioration of the image quality due to the air bubble in the cooling fluid L generated by the circulation of the cooling fluid L can be suppressed.

The present invention is not limited to the above embodiments, and it can be modified in various ways.

In the above embodiments, a transparent substrate such as a glass may be provided to cover the surface of the liquid crystal panel and the polarizing plate, and the cooling unit may cool the liquid crystal panel and the polarizing plate via the transparent substrate.

The flow path block unit may be formed in other shapes such as a trapezoid shape in the section cut at the plane along the flow direction of the cooling fluid supplied from the feed port.

It should be understood by those skilled in the art that various modifications, combinations, sub-combinations and alterations may occur depending on design requirements and other factors in so far as they are within scope of the appeared claims or the equivalents thereof.

What is claimed is:

1. A liquid crystal display apparatus including a light source emitting light, a liquid crystal panel modulating the light emitted by the light source, and a cooling unit cooling a surface of the liquid crystal panel by using a cooling fluid, the light emitted from the light source transmitting into the cooling fluid, the light emitted from the light source is used for displaying an image by the liquid crystal panel and the cooling fluid, the cooling unit comprising:
   a receiving unit formed with a feed port to which the cooling fluid is supplied and a drain port from which the cooling fluid is drained, and receiving the cooling fluid supplied from the feed port in a receiving space;
   a cooling fluid pump draining the cooling fluid received in the receiving unit from the drain port, and supplying the cooling fluid from the feed port to the receiving unit to cause the receiving space to receive the cooling fluid; and
   a flow path block unit blocking a part of the flow path of the cooling fluid supplied from the feed port to an area corresponding to the liquid crystal panel in the received unit,
   wherein,
   the receiving space is placed and opposed to a surface of the liquid crystal panel to which the light is emitted from the light source,
   the flow path block unit is placed and opposed to the feed port, and
   the flow path block unit is formed such that the maximum height of its surface roughness is equal to or greater than 10 µm.

2. A liquid crystal display apparatus as set forth in claim 1, wherein the flow path blocking unit is formed such that a region blocking the flow path of the cooling fluid becomes large along a flow direction of the cooling fluid supplied from the feed port to the receiving space by the cooling fluid pump.

3. A liquid crystal display apparatus as set forth in claim 1, further comprising:
   a polarizing plate polarizing either of the light to be emitted to the liquid crystal panel or the light emitted from the liquid crystal panel,
   wherein,
   the polarizing plate is placed and opposed to the liquid crystal panel through the receiving space, and wherein the cooling unit cools the liquid crystal panel and the polarizing plate by using the cooling fluid received in the receiving space.

4. A liquid crystal display apparatus as set forth in claim 3, further comprising;
   a polarizing plate protect unit provided at a receiving space side of the polarizing plate and protecting the polarizing plate from a contact with the cooling fluid received in the receiving space,
   wherein,
   the cooling unit cools the polarizing plate via the polarizing plate protection unit by using the cooling fluid received in the receiving space.

5. A liquid crystal display apparatus as set forth in claim 1, wherein the receiving unit comprises;
   a first receiving unit formed with a first feed port to which the cooling fluid is supplied and a first drain port from which the cooling fluid is drained, and receiving the cooling fluid supplied from the first feed port in the first receiving space, and
   a second receiving unit formed with a second feed port to which the cooling fluid is supplied and a second drain port from which the cooling fluid is drained, and receiving the cooling fluid supplied from the second feed port in the second receiving space,
   wherein,
   the first receiving space placed and opposed to a surface of the liquid crystal panel to which the light is emitted from the light source,
   the second receiving space placed and opposed to the other surface of the liquid crystal panel to which the light is emitted from the light source,
   the flow path block unit comprises a first flow path block unit blocking a part of the flow path of the cooling fluid supplied from the first feed port to an area opposed to the liquid crystal panel in the first receiving unit by the cooling fluid pump,
   a second flow path block unit blocking a part of the flow path of the cooling fluid supplied from the second feed port to an area opposed to the liquid crystal panel in the second receiving unit by the cooling fluid pump,
   the first flow path block unit being placed and opposed to the first feed port,
   the second flow path block unit being placed and opposed to the second feed port, and
   the flow path block unit is formed such that the maximum height of its surface roughness is equal to or greater than 10 µm.

6. A liquid crystal display apparatus as set forth in claim 5, further comprising:
   a coupling unit coupling the first drain port with the second feed port such that the cooling fluid passes through between the first receiving space and the second receiving space,
   wherein,
   the cooling fluid pump supplies the cooling fluid from the first feed port to the first receiving unit, supplies the cooling fluid received in the first receiving unit through the coupling unit to the second receiving unit, and drains the cooling fluid received in the second receiving unit from the second drain port.

7. A liquid crystal display apparatus as set forth in claim 6, wherein the light source emits the light from the first receiving unit side to pass through the liquid crystal panel to the second receiving unit side.

8. A liquid crystal display apparatus as set forth in claim 1, wherein a surface of the liquid crystal panel to be contacted to the cooling fluid is formed such that the maximum height of its surface roughness is equal to or greater than 2 µm.

9. A liquid crystal display apparatus as set forth in claim 1, wherein the cooling unit comprises a heat radiation unit receiving the cooling fluid received in the receiving unit from the drain port, and radiating the heat of the cooling fluid to cool the cooling fluid, and the cooling fluid pump drains the cooling fluid pump received in the receiving unit from the drain port to the heat radiation unit, and supplies the cooling fluid cooed by the radiator from the feed port to the receiving unit.

10. A liquid crystal display apparatus as set forth in claim 1, further comprising a projection unit projecting light emitted from the light source and modulated by the liquid crystal panel.

11. A cooling device cooling a surface of a liquid crystal panel by using a cooling fluid, a light emitted from a light source being emitted to the liquid crystal panel and transmitted into the cooling fluid, the device comprising:

a receiving unit formed with a feed port to which the cooling fluid is supplied and a drain port from which the cooling fluid is drained, and receiving the cooling fluid supplied from the feed port in a receiving space;

a cooling fluid pump draining the cooling fluid received in the receiving unit from the drain port, and supplying the cooling fluid from the feed port to the receiving unit to cause the receiving space to receive the cooling fluid; and a flow path block unit blocking a part of the flow path of the cooling fluid supplied from the feed port to an area corresponding to the liquid crystal panel in the received unit, wherein, the receiving space is placed and opposed to a surface of the liquid crystal panel to which the light is emitted from the light source, and wherein the flow path block unit is placed and opposed to the feed port, and the flow path block unit is formed such that the maximum height of its surface roughness is equal to or greater than 10 μm.

12. A liquid crystal display apparatus including a light source emitting light, a liquid crystal panel modulating the light emitted from the light source, and a cooling unit cooling a surface of the liquid crystal panel by using a cooling fluid, the light emitted from the light source transmitting into the cooling fluid, the light emitted from the light source is used for displaying an image by the liquid crystal panel and the cooling fluid, the cooling unit comprising:

a first receiving unit formed with a first feed port to which the cooling fluid is supplied and a first drain port from which the cooling fluid is drained, and receiving the cooling fluid supplied from the first feed port in the first receiving space;

a second receiving unit formed with a second feed port to which the cooling fluid is supplied and a second drain port from which the cooling fluid is drained, and receiving the cooling fluid supplied from the second feed port in the second receiving space;

a coupling unit coupling the first drain port with the second feed port such that the cooling fluid passes through between the first receiving space and the second receiving space; and a cooling fluid pump supplying the cooling fluid from the first feed port to the first receiving unit, supplying the cooling fluid received in the first receiving unit through the coupling unit to the second receiving unit, and draining the cooling fluid received in the second receiving unit from the second drain port, wherein, the first flow path block unit is placed and opposed to the first feed port, the second flow path block unit is placed and opposed to the second feed port, and the flow path block unit is formed such that the maximum height of its surface roughness is equal to or greater than 10 μm.

* * * * *